(12) United States Patent
Slaughter, Jr. et al.

(10) Patent No.: US 9,834,995 B2
(45) Date of Patent: Dec. 5, 2017

(54) HORIZONTAL DIRECTIONAL DRILL PIPE DRIVE CONNECTION WITH LOCKING FEATURE

(71) Applicant: The Charles Machine Works, Inc., Perry, OK (US)

(72) Inventors: Greg L. Slaughter, Jr., Perry, OK (US); Floyd R. Gunsaulis, Perry, OK (US); Max A. Metcalf, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 14/960,639

(22) Filed: Dec. 7, 2015

(65) Prior Publication Data
US 2016/0084016 A1    Mar. 24, 2016

Related U.S. Application Data

(63) Continuation of application No. 13/965,961, filed on Aug. 13, 2013, now Pat. No. 9,206,851.
(Continued)

(51) Int. Cl.
*E21B 17/043* (2006.01)
*E21B 17/046* (2006.01)
(Continued)

(52) U.S. Cl.
CPC ............ *E21B 17/046* (2013.01); *E21B 17/03* (2013.01); *E21B 17/042* (2013.01); *E21B 17/043* (2013.01); *F16B 3/00* (2013.01); *F16D 1/033* (2013.01); *Y10T 403/3986* (2015.01); *Y10T 403/551* (2015.01); *Y10T 403/56* (2015.01); *Y10T 403/67* (2015.01)

(58) Field of Classification Search
CPC ........ E21B 17/03; E21B 17/04; E21B 17/042; E21B 17/0423; E21B 17/0426; E21B 17/043; E21B 17/046; F16B 2/065; F16B 3/00; F16D 1/033; F16D 1/0894; F16D 1/108; Y10T 403/3986; Y10T 403/551; Y10T 403/556; Y10T 403/56; Y10T 403/66; Y10T 403/67; Y10T 403/7009; Y10T 403/7045
USPC ....... 403/200, 293, 296, 299, 341, 342, 350, 403/364
See application file for complete search history.

(56) References Cited

U.S. PATENT DOCUMENTS 1,054,812 A  *  3/1913  Zierath ................. E21B 17/04
                                                              285/330
1,494,524 A     5/1924  Adamson
(Continued)

*Primary Examiner* — Josh Skroupa
(74) *Attorney, Agent, or Firm* — Tomlinson McKinstry, P.C.

(57) ABSTRACT

A spindle assembly for connecting a drill string to a rotational drive for use in a horizontal directional drilling operation. The assembly comprises a saver sub attached to the rotational drive, and a drive chuck for connection to the drill string. The drive chuck and saver sub form a torque-transmitting connection by engaging through a seat in the saver sub and an engagement point on the drive chuck. Dowel pins may be used to rotationally lock and provide the engagement between the saver sub and the drive chuck. A collar may thread to the saver sub and cause an interference fit by engaging the drive chuck at a shoulder.

35 Claims, 8 Drawing Sheets

Related U.S. Application Data

(60) Provisional application No. 61/823,015, filed on May 14, 2013, provisional application No. 61/683,968, filed on Aug. 16, 2012.

(51) Int. Cl.
*F16D 1/033* (2006.01)
*E21B 17/03* (2006.01)
*E21B 17/042* (2006.01)
*F16B 3/00* (2006.01)

(56) References Cited

U.S. PATENT DOCUMENTS

| | | | |
|---|---|---|---|
| 2,022,055 | A | 11/1935 | Sanderson |
| 3,623,753 | A | 11/1971 | Henry |
| 4,674,774 | A | 6/1987 | Williams |
| 4,733,442 | A | 3/1988 | Asai |
| 5,332,049 | A | 7/1994 | Tew |
| 5,415,441 | A | 5/1995 | Kilgore et al. |
| 7,155,764 | B2 * | 1/2007 | Sawatzky .............. A61G 1/013 403/316 |
| 7,226,090 | B2 * | 6/2007 | Hughes ................ E21B 17/028 285/330 |
| 7,753,614 | B2 | 7/2010 | Kobayashi |
| 9,388,923 | B2 * | 7/2016 | Romano ............... F16L 19/025 |
| 2010/0190560 | A1 * | 7/2010 | Jaworowicz ........... F16D 1/033 464/150 |
| 2012/0267170 | A1 | 10/2012 | Langenfeld et al. |
| 2013/0146305 | A1 | 6/2013 | Dupal et al. |
| 2013/0164081 | A1 | 6/2013 | Hermes et al. |
| 2013/0228379 | A1 * | 9/2013 | Zhou ....................... E21B 3/04 175/61 |

* cited by examiner

HORIZONTAL DIRECTIONAL DRILL PIPE DRIVE CONNECTION WITH LOCKING FEATURE

CROSS REFERENCE TO RELATED APPLICATION

This application is a continuation of U.S. patent application Ser. No. 13/965,961, filed Aug. 13, 2013, now U.S. Pat. No. 9,206,851, which claims the benefit of provisional patent application Ser. No. 61/823,015, filed May 14, 2013, and provisional patent application Ser. No. 61/683,968, filed Aug. 16, 2012, the entire contents of which are incorporated herein by reference.

FIELD

The present invention relates generally to connection mechanisms for transferring torque to a drill string in horizontal directional drilling processes.

BACKGROUND

Horizontal boring machines are used to install utility services or other products underground. Horizontal directional drilling eliminates surface disruption along the length of the project, except at the entry and exit points, and reduces the likelihood of damaging previously buried products.

The boring operation is a process of using a boring machine to advance a drill string through the earth along a desired path. The boring machine generally comprises a frame, a drive system mounted on the frame and connected to one end of the drill string, and a boring tool connected to the other end of the drill string. The drive system provides thrust and rotation needed to advance the drill string and the boring tool through the earth. The drill string is generally comprised of a plurality of drill pipe sections joined together at threaded connections. As the pilot bore operation proceeds, the drill string is lengthened by repeatedly adding pipe sections to the drill string.

When the pilot bore operation is completed, the drill string is pulled back through the borehole during a backreaming operation, generally with the utility line or product to be installed underground connected to the end of the drill string. During this backreaming operation, pipe sections are removed from the drill string as the drill string gets shorter. Each time a pipe section is taken from the drill string. As is the case with the addition of pipe sections to the drill string, the process is repetitive.

A "driver", or "saver sub", is used as a connection to transmit the torque and thrust/pullback forces generated by the rotational drive of an HDD machine to a drill string. The connection comes in contact with every pipe involved with a boring operation during both boring and pull-back and thus encounters high rates of wear on the connection surfaces of the component. As such, it is beneficial to make the part easily replaceable. Further, it is beneficial to limit the wear points of the saver sub such that it is easy to replace, without requiring excessive labor to rebuild the saver sub.

SUMMARY

The present invention comprises a torque-transmitting assembly for use with a rotational drive used in a horizontal directional drilling operation. The assembly comprises a saver sub and a drive chuck. The saver sub is rotationally attached to the rotational drive and comprises a seat and a threaded portion. The drive chuck comprises an engagement point to engage the seat and a connection member for attachment to the drill string. The drive chuck and saver sub are rotationally locked.

In another embodiment of the invention, it is directed to a torque-transmitting assembly for use with a rotational drive used in a horizontal directional drilling operation. The assembly comprises a saver sub, a drive chuck, and a collar. The saver sub is rotationally attached to the rotational drive. The saver sub comprises a seat and a threaded portion. The drive chuck comprises a shoulder, an engagement point to engage the seat, and a connection member for attachment to the drill string. The collar comprises a threaded portion and an internal shoulder. The internal shoulder contacts the shoulder of the drive chuck such that threading the collar onto the saver sub rotationally locks the saver sub to the drive chuck.

In another embodiment, the invention is directed to a spindle assembly for rotating a drill string. The spindle assembly comprises a saver sub, a drive chuck, and a collar. The drive chuck is engaged with the saver sub in non-threaded torque-transmitting engagement. The collar is disposed about both an outer surface of the saver sub and an outer surface of the drive chuck to secure the saver sub to the drive chuck. The collar is threaded on the saver sub.

DESCRIPTION OF THE PREFERRED EMBODIMENT

Figure 1:
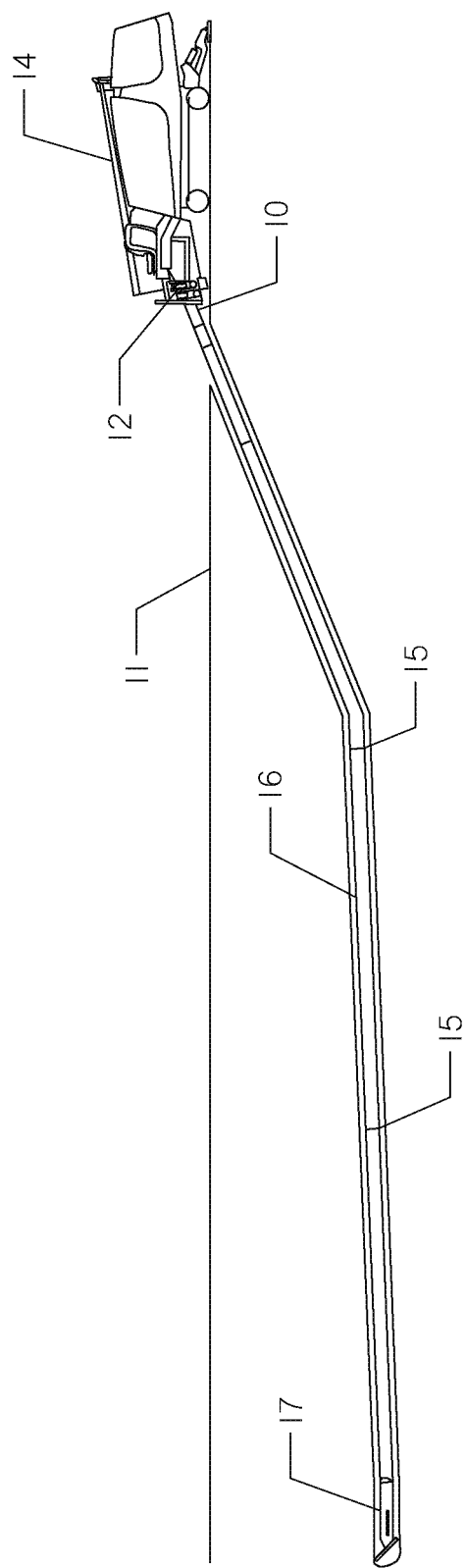
FIG. 1 is a side view of an HDD machine and drill string for use with the spindle assembly of the invention disclosed herein.

The disclosed invention is directed to a torque-transmitting spindle assembly 10 for use in horizontal directional drilling operations for boring under a surface of the ground 11. With reference to FIG. 1, the spindle assembly 10 connects a rotational drive 12 of a horizontal directional drilling (HDD) apparatus 14 to a drill string 16. The drill string 16 comprises a plurality of segments which meet at pipe joints 15. The spindle assembly 10, when fully assembled as described in more detail below, is replaceable when the repeated making up and breaking out sections of drill pipe causes wear. Rotation of the rotational drive 12 causes the spindle assembly 10 to rotate, which transmits torque to the drill string 16 when the HDD apparatus 14 is in operation. This torque can make up or break loose the drill string 16 during addition or removal of individual pipe sections, or transmit thrust and rotation through the drill string to a downhole tool 17.

Figure 2:
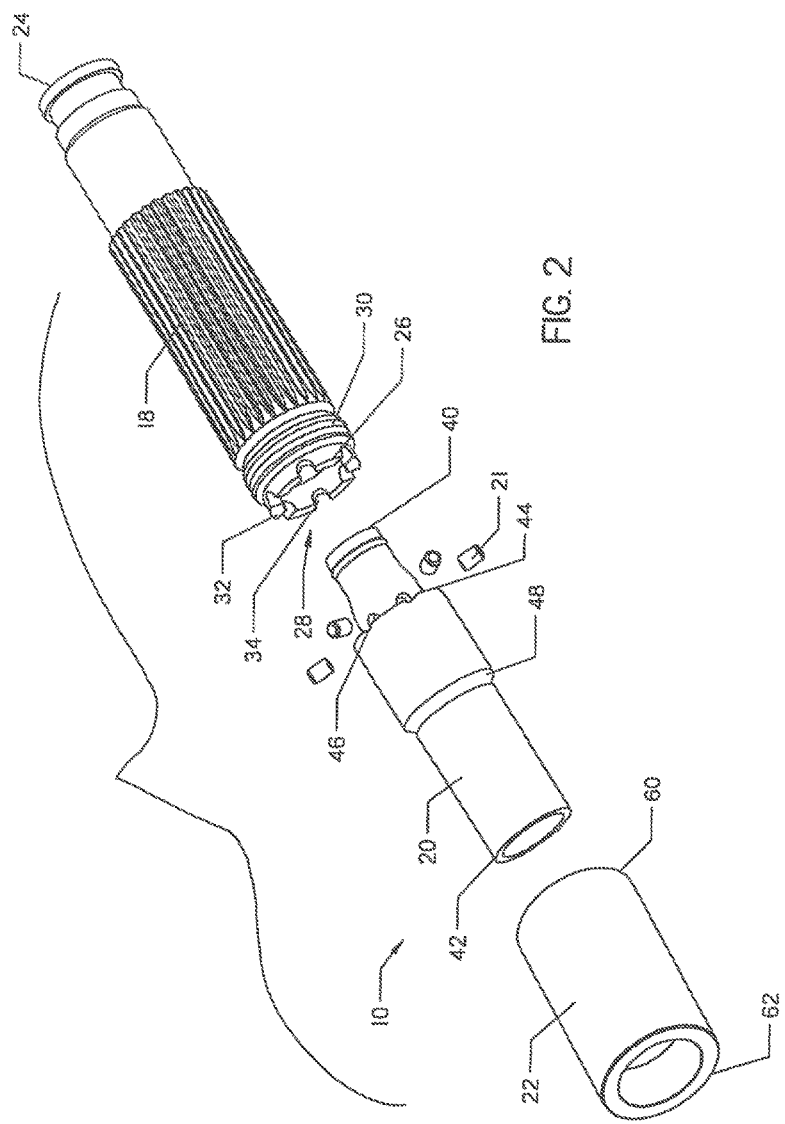
FIG. 2 is an exploded perspective view of component parts of a spindle assembly.

With reference to FIG. 2, the spindle assembly 10 comprises a saver sub 18, a drive chuck 20, a plurality of dowel pins 1, and a collar 22. The saver sub 18 comprises a first end 24 and a second end 26. The first end 24 is fixedly attached to the rotational drive 12 (FIG. 1). The connection may take place through a flange, a sliding spline connection, a welded connection, a frictional interference fit, or other suitable methods of joining the rotational drive 12 to the saver sub 18. As shown in FIG. 2, the saver sub 18 comprises a spline connection. The second end 26 comprises an opening 28, a threaded portion 30 and a seat 32. The opening 28 may be formed such that the drive chuck 20 comes in contact with the inner wall of the saver sub 18, or may be clearance fit such that the saver sub and drive chuck do not contact one another within the opening. As shown, the seat 32 comprises a plurality of castellations 34 formed in the second end 26. The castellations 34 are configured to engage a torque-carrying feature to transmit torque from the HDD apparatus 14 (FIG. 1) to the drill string 16 (FIG. 1). As shown herein, the castellations 34 engage the plurality of dowel pins 21. As shown, there are six dowel pins 21, though other numbers are possible. The castellations 34 may be formed with a tapered opening to ensure that the dowel pins 21 can slip easily in and out of position when the spindle assembly 10 is not assembled. As shown, the spindle assembly 10 comprises six castellations 34 and dowel pins 21.

The drive chuck 20 comprises a first end 40, a second end 42, an engagement point 44, a plurality of depressions 46, and a shoulder 48. The first end 40 extends within the opening 28 of the saver sub 18. The first end 40 may operate to transmit thrust between the saver sub 18 and drive chuck 20, or may alternatively only seal the connection between the saver sub and drive chuck. The second end 42 is a connection member for thrust and rotation-transmitting connection to a drill string (FIG. 1). This connection at the second end 42 may be a threaded connection. The threaded connection of the second end 42 may be on the inside or outside of the drive chuck 20. The engagement point 44 is adapted to engage the seat 32 of the saver sub 18 for transmission of rotation forces between the saver sub and the drive chuck 20. The engagement between the seat 32 and engagement point 44 may also transmit thrust between the drive chuck 20 and saver sub 18.

The plurality of depressions 46 provide a location for the dowel pins 21 to be placed. The depressions 46 may be formed with a tapered opening to allow the dowel pins 21 to easily slip into and out of the depressions. Alternatively, the depressions 46 may have parallel walls to provide a press-fit connection when the spindle assembly 10 is assembled. The engagement point 44 may be machined such that the engagement point only engages the seat 32 through the dowel pins 21. In this embodiment, no direct connection between the seat 32 and engagement point 44 takes place, and all the torque-transmission and thrust-transmission occurs between the seat and the dowel pins 21 and the dowel pins and the engagement point. The depressions 46 may be evenly spaced or may be unevenly spaced to allow for "clocking" orientation between the saver sub 18 and the drive chuck 20. The shoulder 48 comprises a section of the drive chuck 20 where the diameter of the drive chuck changes. Preferably, the shoulder 48 comprises a sloped surface for interaction with internal features of the collar (FIG.

The collar 22 comprises a first end 60 and a second end 62. The first end interacts with the threaded portion 30 of the saver sub 18 to hold the elements of the spindle assembly 10 together. One skilled in the art will appreciate that the spindle assembly could transmit torque without the use of the collar 22.

Figure 3:
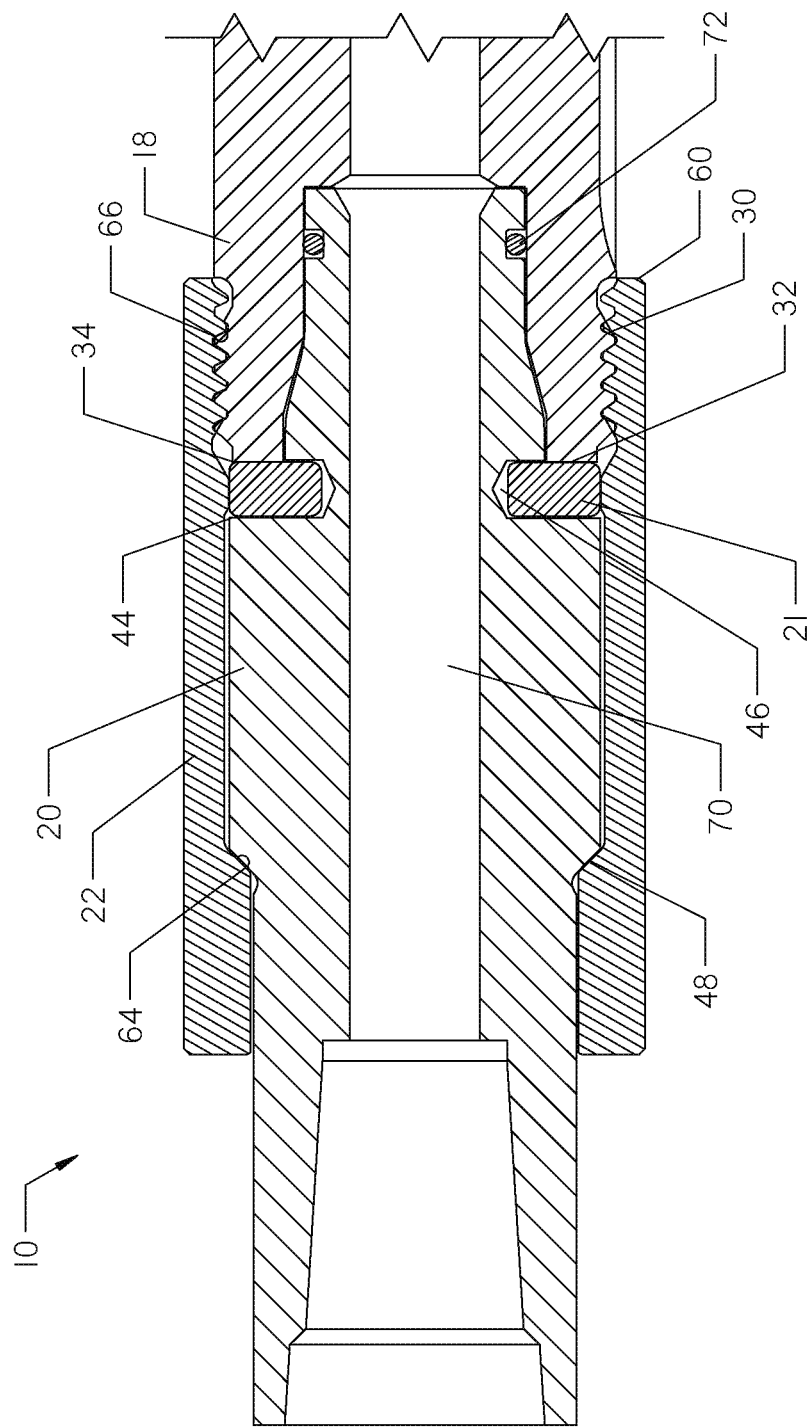
FIG. 3 is a sectional side view of the assembled spindle assembly of FIG. 2.

With reference now to FIG. 3, the spindle assembly 10 is shown formed together in cross-section. As shown, the dowel pins 21 are located within the depressions 46 of the drive chuck 20 and the castellations 34 of the saver sub 18. The depressions 46 have a tapered bottom to allow easy removal when the spindle assembly 10 is disassembled. The collar 22 further comprises an internal shoulder 64 and a threaded portion 66 formed on its internal wall. The threaded portion 66 is located at the first end 60 of the collar 22 and interacts with the threaded portion 30 of the saver sub 18 to attach the collar to the saver sub. When fully formed, the internal shoulder 64 contacts the shoulder 48 of the drive chuck 20. This connection forces the engagement point 44 toward the seat 32.

One skilled in the art will appreciate that an angle of contact between the internal shoulder 64 and shoulder 48 may be set at acute angles, or angles below 45 degrees. This causes a radial component in the preload three between the collar 22 and the drive chuck 20 as the threaded section 66 of the collar is tightened onto the threaded portion 30 of the saver sub. Thus, during the assembly of the spindle assembly 10, some of the rotational energy used forces the diameter of the collar 22 to expand and the diameter of the drive chuck 20 to contract. This reduces relative movement between the saver sub 18 and drive chuck 20 and thus decreases wear on internal components of the spindle assembly 10.

When fully formed, the spindle assembly 10 may comprise an internal channel 70 located within the center of the saver sub 18 and drive chuck 20. The internal channel 70 allows fluid to be transmitted from the HDD machine (FIG. 1) to the drill string (FIG. 1). A seal 72 is located about a periphery of the drive chuck 20 to prevent fluid from escaping at the connection of the drive chuck and saver sub 18. Alternatively, the seal could be placed within the opening 28 of the saver sub for mating with the first end 40 of the drive chuck 20. As shown, the seal 72 is an o-ring. Other elastomeric or face seal mechanisms may be used to provide a leak free connection between the drive chuck 20 and the saver sub 18.

Figure 4:
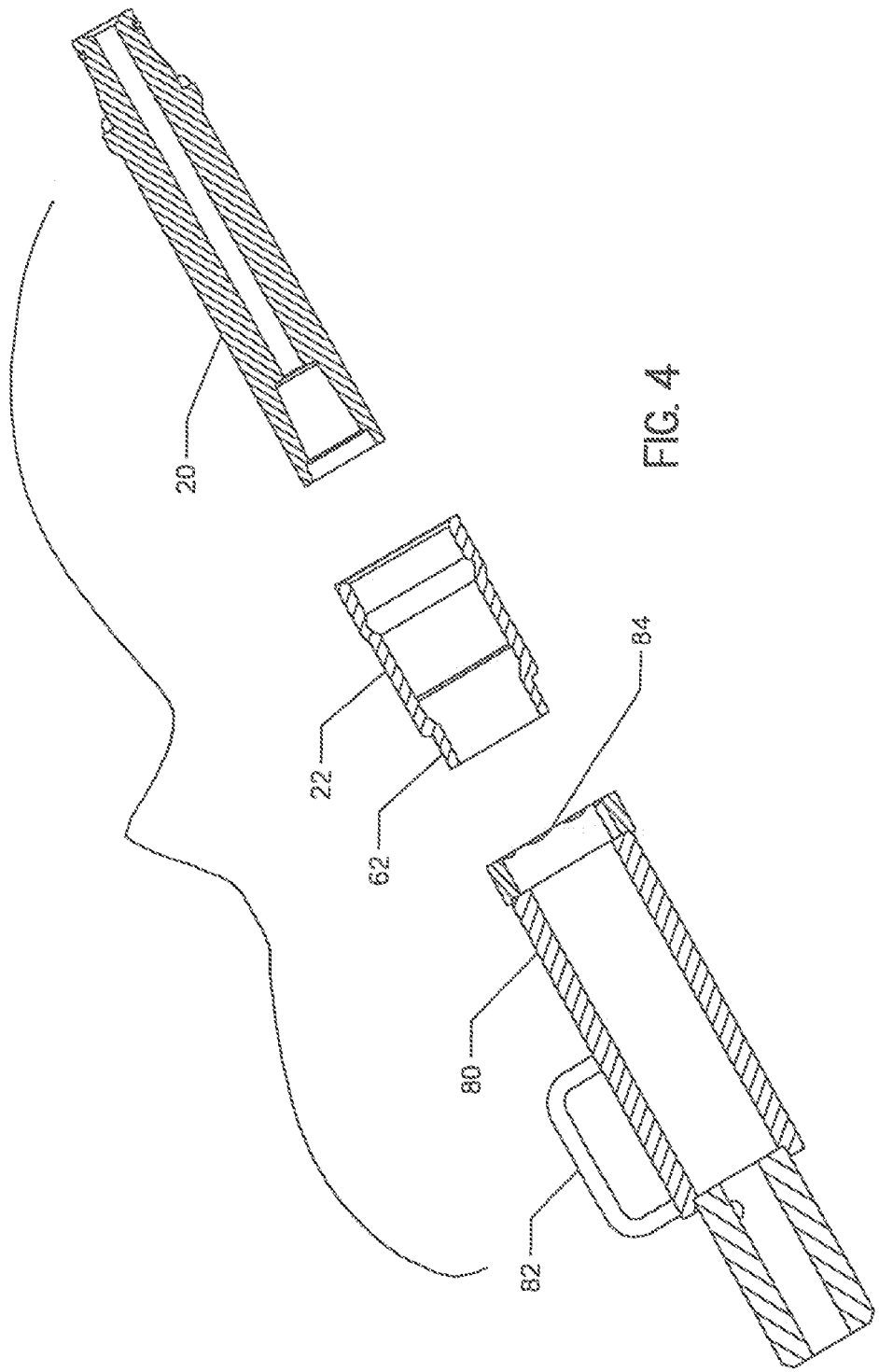
FIG. 4 is a sectional exploded perspective view of a collar, a drive chuck, and a wrench for use with the spindle assembly of FIG. 2.

With reference now to FIG. 4, the collar 22 and drive chuck 20 are shown in cross-section with a wrench 80. The wrench comprises a handle 82 and a locking feature 84. The handle 82 allows an operator to apply torque and turn the wrench 80. The locking feature is adapted to mate with the second end 62 of the collar 22. The second end 62 and locking feature 84 have a complementary polygonal profile. Thus, the wrench 80 may be used to thread and unthread the collar 22 to the saver sub 18 (FIG. 3). The operator may either rotate the wrench 80, or the collar 22 may be held place by the wrench or a vise while the rotational drive 12 (FIG. 1) rotates the saver sub 18.

Figure 5:
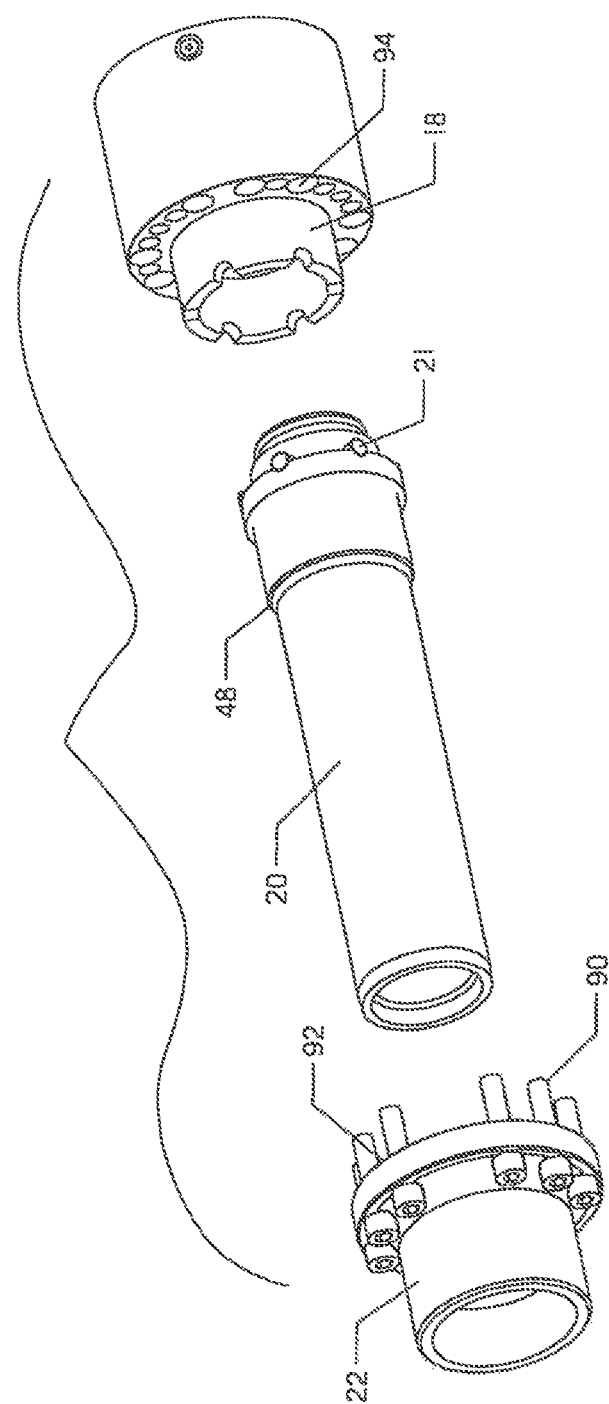
FIG. 5 is an exploded perspective view of an alternative embodiment of a spindle assembly.

With reference to FIG. 5, the collar 22 may alternatively be attached to the saver sub 18 using a plurality of bolts 90 through a flange 92 in the collar. The plurality of bolts apply a clamping load to the drive chuck 20 through its shoulder 48. The saver sub 18 comprises a plurality of bolt holes 94 adapted to receive the bolts 90. This embodiment transfers torque between the saver sub 18 and drive chuck 20 through dowel pins 21 as described with reference to FIGS. 2 and 3.

Figure 6:
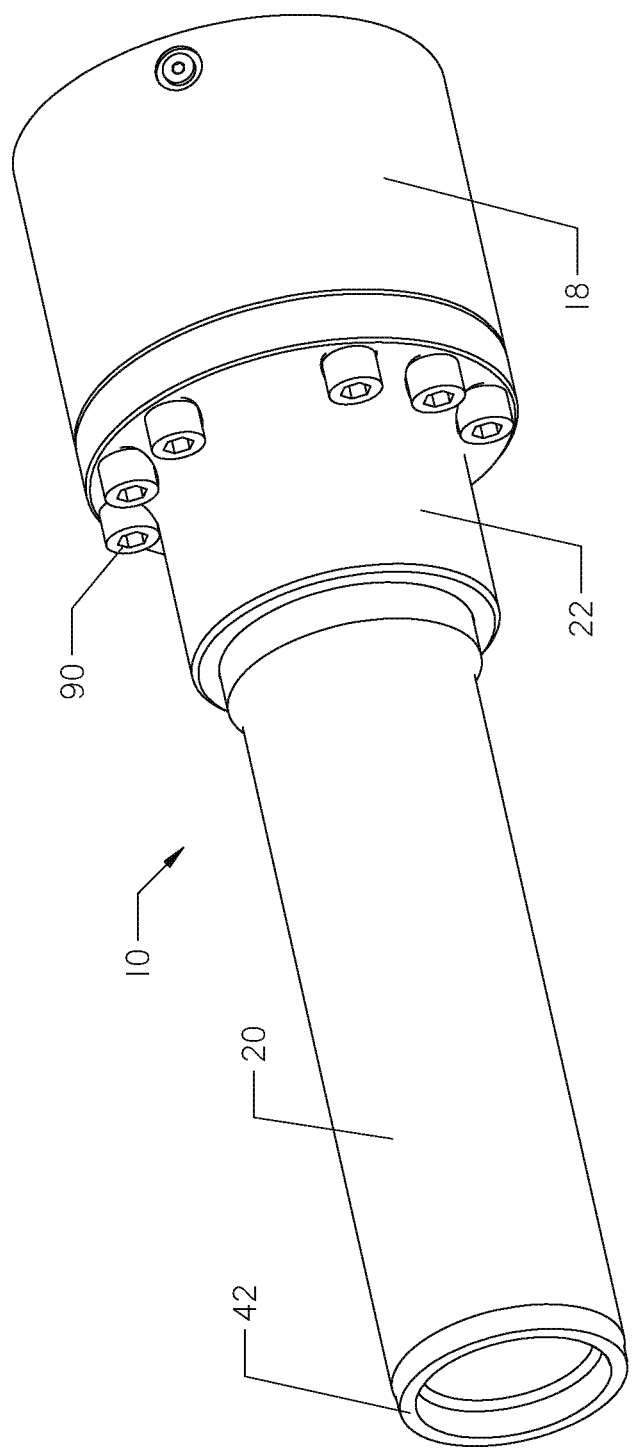
FIG. 6 is a perspective view of the assembled spindle assembly of FIG. 5.

When fully connected to the rotational drive 12 of the HDD machine 14, this embodiment of the spindle assembly 10 appears as shown in FIG. 6. The spindle assembly 10 is attached to the rotational drive 12 (FIG. 1) at the sub saver 18 through a flange connection. The collar 22 is connected to the sub saver 18 through bolts 90. The drive chuck 20 is engaged by the collar 22 at its shoulder (FIG. 5) and is adapted for connection to a drill string (not shown) at its second end 42.

Figure 7:
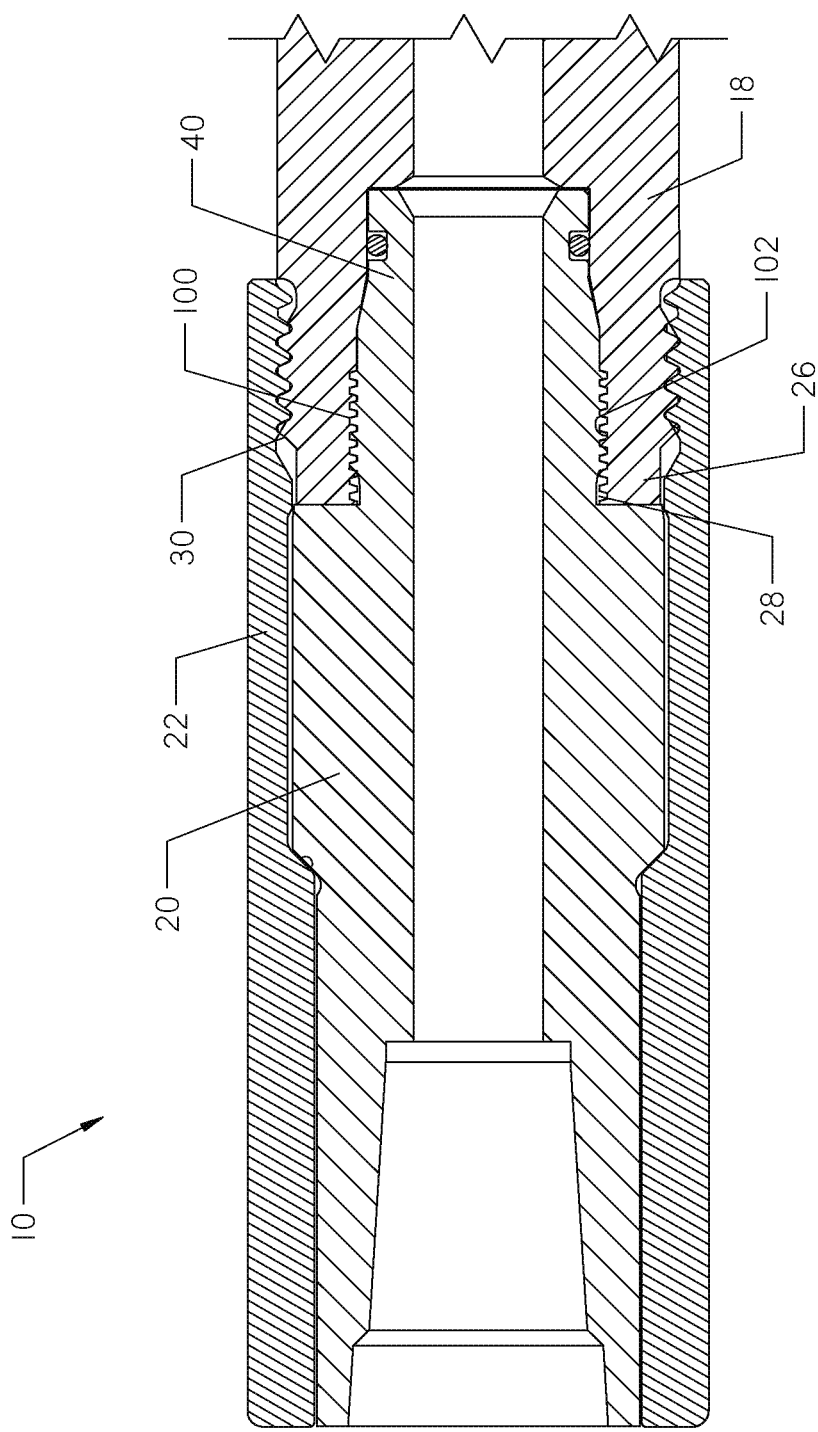
FIG. 7 is a sectional side view of an alternative embodiment of a spindle assembly.

Alternative embodiments of the spindle assembly 10 without the use of dowel pins are disclosed herein. With reference to FIG. 7, the first end 40 of the drive chuck 20 comprises an external threaded portion 100. The second end 26 of the saver sub 18 comprises an internal threaded portion 102 within the opening 28. The pitch of the internal threaded portion 102 may be slightly different than the pitch of the threaded portion 30 of the saver sub 18. Alternatively, the internal threaded portion may allow for a "right-hand" thread while the threaded portion 30 is a "left-hand" thread, or vice versa. As such, the forces generated on the internal threaded portion during make up and break out of the collar 22 on the saver sub 18 would not unthread the drive chuck 20.

Figure 8:
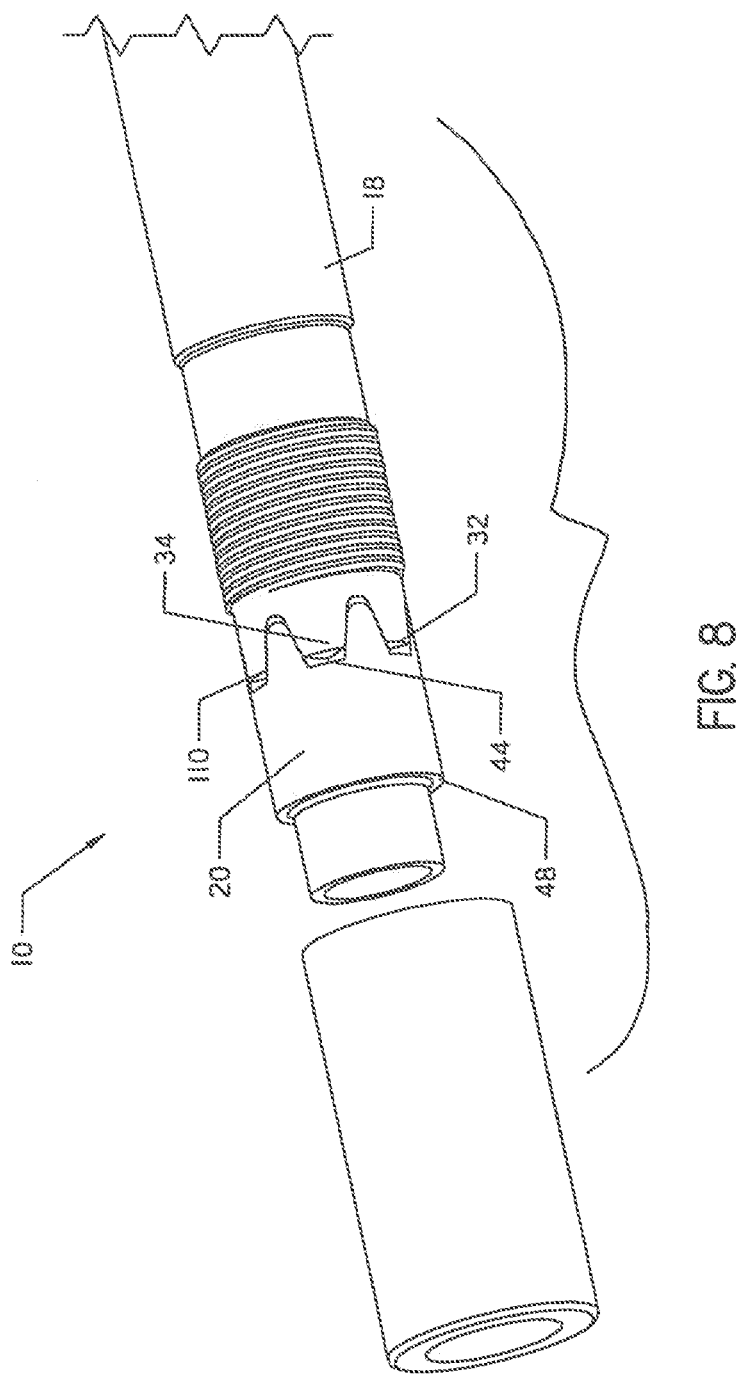
FIG. 8 is an exploded perspective view of an alternative embodiment of a spindle assembly.

With reference to FIG. 8, another alternative embodiment of the spindle assembly 10 is shown. In this embodiment, the seat 32 of the saver sub 18 comprises castellations 34. These castellations 34 are adapted to directly engage complementary castellations 110 of the engagement point 44 of the drive chuck 20. Torque transmission occurs directly on the complementary castellations 34, 110. The castellations 34, 110 may be machined or casted. As shown, the shoulder 48 of the drive chuck 20 is perpendicular, rather than the angled surface of FIG. 3, but it will be appreciated that these may alternatively be angled as discussed above.

In operation, the spindle assembly 10 is assembled for use with HDD machine 14. The saver sub 18 is fixed to the rotational drive 12 of the HDD machine. The dowel rods 21 are placed within the depressions 46 of the drive chuck 20. The drive chuck 20 is then placed into the saver sub 18 such that the seat 32 is proximate the engagement point 44. As shown in FIG. 2, the saver sub 18 engages the drive chuck 20 in torque-transmitting arrangement through the dowel rods 21. The collar 22 is then placed around a perimeter of the drive chuck 20 and secured to the saver sub 18 such that the spindle assembly is rotationally locked. The collar 22 may be tightened by using a wrench 80. Alternatively, the collar 22 may be clamped by vice wrenches (not shown) of the HDD machine 14, then tightened by rotating the rotational drive 12 of the HDD machine 14 to tighten the collar on the saver sub 18. Sections of drill string 16 may then be threaded onto the drive chuck 20 as the spindle assembly is used to make up or break out sections of drill string, and to transmit torque to a downhole tool 17 for use in HDD operations.

While the dowel rods 21 have been disclosed herein as seated in depressions 46 of the drive chuck 20 for interaction with castellations on the saver sub 18, it is anticipated that this may be reversed. The depressions may alternatively be placed on the saver sub 18 for interaction with castellations on the drive chuck 20. In this alternative arrangement, the components would still be constrained by the tightening of the collar 22.

One skilled in the art will appreciate that the embodiments herein are not limiting on the scope of this invention. Alternative mechanisms for locking the spindle assembly 10 together such that torque is transmitted between the rotational drive 12 and drill string 16 are possible with slight variation. For example, the dowel rods 21 may be integrally formed with the drive chuck 20. The dowel rods may be replaced with a ring that interacts with the drive chuck 20 and saver sub 18 to transmit torque.

Further, the connection discussed herein could also be used to connect the drill string 16 with a downhole tool or cutting apparatus (not shown) at a terminal end of the drill string.

The spindle assembly 10 disclosed may be modified for use with a dual-member drill string 16, for torque transmission to the inner member, outer member, or both (not shown).

What is claimed is:

1. A torque-transmitting assembly for use in a horizontal directional drilling operation, the assembly comprising:
    a saver sub having an end;
    a drive chuck having an end;
    an external collar that surrounds at least a portion of the saver sub and drive chuck and maintains their respective ends in coaxial and non-contacting relationship; and
    an internal locking mechanism that maintains the drive chuck and saver sub in rotationally-fixed relationship.

2. The torque-transmitting assembly of claim 1 wherein the internal locking mechanism comprises at least one dowel pin.

3. The torque-transmitting assembly of claim 2 wherein the drive chuck defines at least one depression for placement of the at least one dowel pin.

4. The torque-transmitting assembly of claim 2 wherein the internal locking mechanism comprises six dowel pins.

5. The torque-transmitting assembly of claim 2 wherein the at least one dowel pin is characterized by a circular cross-section.

6. The torque-transmitting assembly of claim 1 wherein the internal locking mechanism is placed within at least one recess formed in the respective ends of the saver sub and the drive chuck.

7. The torque-transmitting assembly of claim 1 wherein the drive chuck comprises at least one depression for placement of the internal locking mechanism.

8. The torque-transmitting assembly of claim 7 wherein the internal locking mechanism is radially removable from the at least one depression when the collar is disassembled from the drive chuck and saver sub.

9. The torque-transmitting assembly of claim 1 further comprising:
    a shoulder disposed on the drive chuck; and
    an internal shoulder disposed within the collar;
    wherein the internal shoulder contacts the shoulder of the drive chuck when the saver sub and the collar are attached.

10. The torque-transmitting assembly of claim 9 wherein the saver sub and collar are attached in a threaded connection.

11. The torque-transmitting assembly of claim 9 wherein the saver sub and collar are attached with bolts.

12. The torque-transmitting assembly of claim 9 wherein the drive chuck is attached to a dual-member pipe string.

13. The assembly of claim 1, the saver sub and the drive chuck each having a rim in which a plurality of concavities are formed.

14. The assembly of claim 13 in which at least a portion of the internal locking mechanism is positioned within the concavities of both rims.

15. The assembly of claim 13 in which each concavity extends between spaced boundaries on its rim and subtends an included angle of less than 360 degrees.

16. The assembly of claim 13 in which the plural concavities in one rim are alignable in one-to-one face-to-face correspondence with the plural concavities in the other rim.

17. The assembly of claim 13 in which each rim defines a flat and annular surface within which the concavities are formed.

18. A spindle assembly for rotating a drill string, the spindle assembly comprising:
- a saver sub;
- a drive chuck;
- a collar at least partially surrounding the saver sub and the drive chuck; and
- a key disposed between the saver sub and the drive chuck;
- wherein the saver sub and drive chuck are in torque-transmitting engagement solely at the collar and the key.

19. The spindle assembly of claim 18 wherein the collar is movable between a locked position and an unlocked position.

20. The spindle assembly of claim 19 wherein the drive chuck is interference fit between the collar and the key when the collar is in the locked position.

21. The spindle assembly of claim 20 wherein the collar comprises an inner shoulder and the drive chuck comprises a corresponding outer shoulder.

22. The spindle assembly of claim 18 wherein the drive chuck comprises at least one depression corresponding to the key.

23. The spindle assembly of claim 22 wherein the key is radially removable from the at least one depression when the collar is disassembled from the drive chuck and saver sub.

24. The spindle assembly of claim 18 wherein the key comprises at least one dowel pin.

25. The assembly of claim 18, the saver sub and the drive chuck each having a rim in which a plurality of concavities are formed.

26. The assembly of claim 25 in which at least a portion of the key is positioned within the concavities of both rims.

27. The assembly of claim 25 in which each concavity extends between spaced boundaries on its rim and subtends an included angle of less than 360 degrees.

28. The assembly of claim 25 in which the plural concavities in one rim are alignable in one-to-one face-to-face correspondence with the plural concavities in the other rim.

29. The assembly of claim 25 in which each rim defines a flat and annular surface within which the concavities are formed.

30. A kit comprising:
- a collar configured to surround interfacing ends of a saver sub and a drive chuck to maintain them in coaxial and non-contacting relationship; and
- a plurality of dowel pins configured to lock the collared saver sub and drive chuck in rotationally-fixed relationship.

31. The kit of claim 30 in which each dowel pin is registrable with concavities formed in each of the saver sub and the drive chuck.

32. The kit of claim 30, the saver sub and the drive chuck each having a rim in which a plurality of concavities are formed.

33. The kit of claim 32 in which each concavity extends between spaced boundaries on its rim and subtends an included angle of less than 360 degrees.

34. The kit of claim 32 in which the plural concavities in one rim are alignable in one-to-one face-to-face correspondence with the plural concavities in the other rim.

35. The assembly of claim 32 in which each rim defines a flat and annular surface within which the concavities are formed.

* * * * *

UNITED STATES PATENT AND TRADEMARK OFFICE
CERTIFICATE OF CORRECTION

PATENT NO. : 9,834,995 B2
APPLICATION NO. : 14/960639
DATED : December 5, 2017
INVENTOR(S) : Slaughter, Jr. et al.

It is certified that error appears in the above-identified patent and that said Letters Patent is hereby corrected as shown below:

In the Specification

Column 3, Line 6, please delete "1" and substitute therefore --21--.
Column 3, Line 65, please delete "(FIG." and substitute therefore --(FIG. 3).--.
Column 4, Line 22, please delete "three" and substitute therefore --force--.
Column 4, Line 53, after the word "held", please insert --in--.

Signed and Sealed this
Twentieth Day of February, 2018

Andrei Iancu
*Director of the United States Patent and Trademark Office*